April 28, 1970     J. MERCIER     3,508,400

POSITION CONTROL SYSTEM

Filed July 2, 1969

INVENTOR.
JEAN MERCIER

BY

ATTORNEY

United States Patent Office 3,508,400
Patented Apr. 28, 1970

3,508,400
POSITION CONTROL SYSTEM
Jean Mercier, 501 Bloomfield Ave.,
Caldwell, N.J. 07006
Continuation-in-part of application Ser. No. 713,580,
Mar. 18, 1968. This application July 2, 1969, Ser.
No. 838,471
Claims priority, application France, July 11, 1968,
158,756
Int. Cl. F15b 15/18, 15/26; B63h 25/22
U.S. Cl. 60—52                                   7 Claims

ABSTRACT OF THE DISCLOSURE

A hydraulic system for controlling the position of a movable member such as a rudder shaft by an electrically controlled pilot valve which in turn controls a hydro-valve to connect a high pressure source of fluid under pressure to a hydraulic actuator for said rudder shaft, hydraulic circuit means being provided to insure that the hydro-valve will be supplied by said pilot valve with a low pressure source of fluid under pressure for actuation thereof when said hydro-valve is in either of its extreme operating positions.

---

This application is a continuation-in-part of copending application Ser. No. 713,580, filed Mar. 18, 1968.

As conducive to an understanding of the invention, it is noted that where a hydraulic system is provided which includes a hydraulically actuated distributor valve that in neutral position connects a source of fluid under pressure to an electrically actuated pilot valve, which, when energized, directs flow of fluid to either side of the distributor valve to set the latter to either of two extreme positions, thereby to connect said source of fluid under pressure to one side of a hydraulic actuator and the return fluid from the other side of the actuator to the pilot valve, if the distributor valve should stick in one of its extreme positions, since at the end of the stroke of the hydraulic actuator there would be no return flow from the actuator, and where connection of the source of fluid under pressure to the actuator cuts off flow therefrom to the pilot valve, subsequent actuation of the pilot valve would not affect the position of the distributor valve or the position of the hydraulic actuator. As a result, the system would be inoperative.

It is accordingly among the objects of the invention to provide an electrically actuated hydraulic system for controlling the position of a movable member such as the rudder of a ship, which system is relatively simple in operation and has relatively few components and which will provide for dependable actuation of the rudder throughout its entire range of movement.

According to the invention these objects are accomplished by the arrangement and combination of elements hereinafter described and more particularly recited in the claims.

In the accompanying drawings in which are shown one of various possible embodiments of the several features of the invention.

Figure 1:
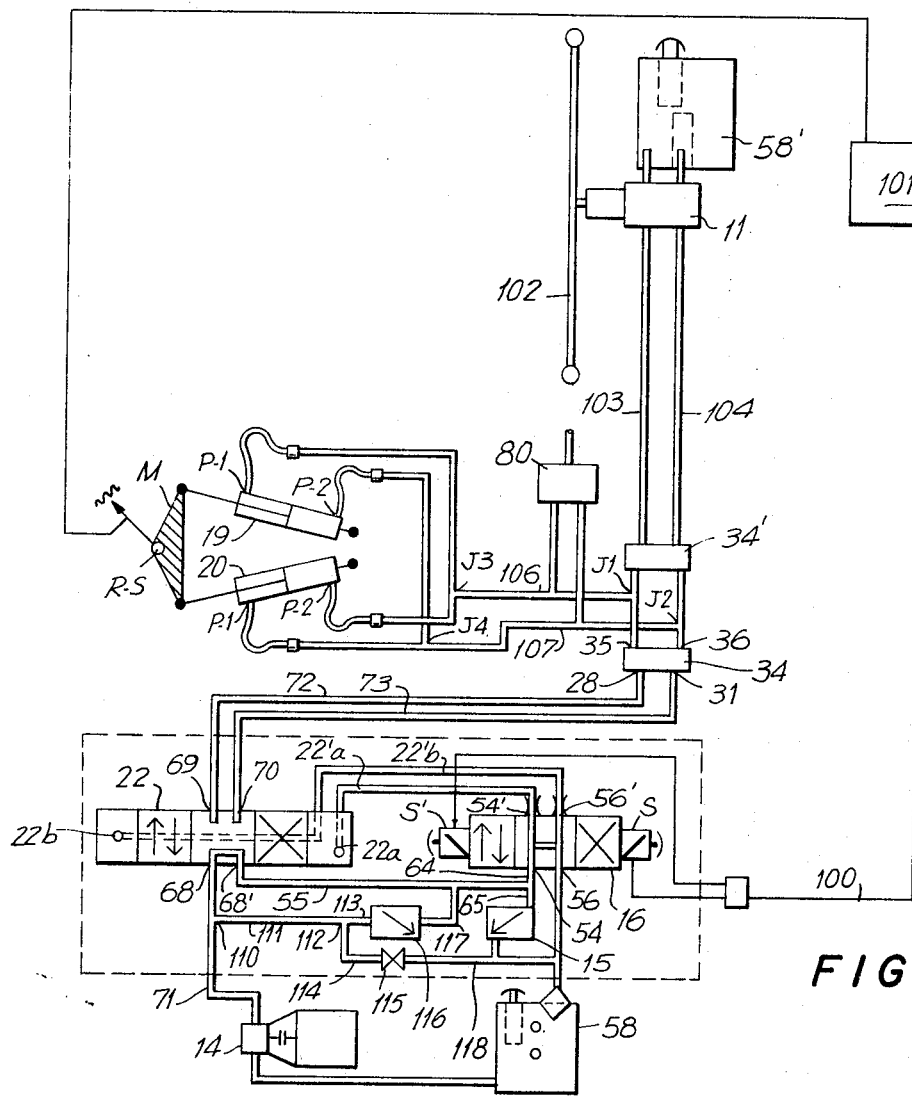
FIG. 1 is a diagrammatic view of the hydraulic control system.

Referring now to the drawings, the system comprises a motor driven pump 14 having an inlet port connected to a fluid reservoir 58. The outlet of pump 14 is connected by line 71 to junction 110 and then to port 68 of main hydraulic valve 22 which is of the gradual opening and closing type.

The valve 22 is a three-position valve and has additional ports 68', 69 and 70. In the neutral position of valve 22, ports 69, 70 are closed and ports 68, 68', are connected to each other. In the first operating position of valve 22 when fluid under pressure is applied through line 22'a to port 22a, ports 68', 69 and ports 68, 70 are connected respectively. In the second operating position of valve 22, when fluid under pressure is applied through line 22'b to port 22b, ports 68, 69 and ports 68', 70 are connected respectively.

The ports 69, 70, which are the control ports of the valve 22 are connected by lines 72, 73 to the ports 28, 31 of a double check valve 34 which also has ports 35, 36.

Figure 2:
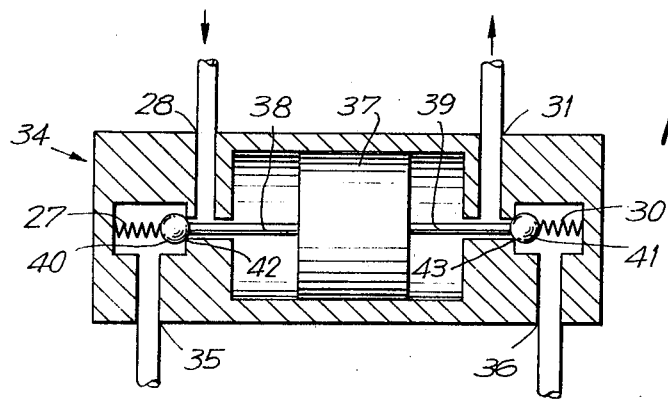
FIG. 2 is a diagrammatic sectional view of a piloted double check valve utilized in the system.

The valve 34 which is of conventional type, is diagrammatically illustrated in FIG. 1 and shown in greater detail in FIG. 2, comprises a piston 37 carrying opposed push rods 38, 39 which control ball valves 40, 41 interposed respectively between ports 28, 35 and 31, 36.

When port 28 is under pressure, the fluid in such port will move the ball 40 to the left against the force of an associated coil spring 27 and will move the piston 37 to the right, the push rod 39 thus moving the ball 41 to the right against the force of an associated coil spring 30. As a result, the port 28 will be connected to port 35 and the port 31 will be connected to port 36. The same operation also occurs when the port 31 is under pressure.

If neither of the ports 28, 31 is under pressure and pressure is developed in ports 35 or 36, the ball valves 40, 41 will be urged against their associated seats defined by orifices 42, 43 respectively to close the ports 28, 31.

The ports 35, 36 of valve 34 are connected to junctions J1 and J2 which are also connected to the ports 35, 36 of an identical valve 34. The ports 28, 31 of valve 34' are connected by lines 103, 104 to a hydraulic pump 11 which is controlled by a manually operable member such as the steering wheel 102 of a vessel, the pump 11 being supplied with fluid from reservoir 58'.

Junctions J–1, J–2 are connected by lines 106, 107 to junctions J–3 and J–4. The lines 106, 107 are connected through pressure relief valve 80 to reservoir 58, the valve 80 being designed to open at say 4,000 p.s.i. The junctions J–3 and J–4 are connected to the ports P–1, P–2 of hydraulic actuators 19 and 20, the piston rods of which are connected to the control member M of the rudder shaft RS.

Due to the connection of the ports P–1, P–2, it is apparent that when fluid under pressure is applied to the port P–1, for example, of the actuator 19 and to the port P–2 of actuator 20, from junction J–3, the associated piston rods will be pulled and pushed to effect turning movement of the rudder shaft RS and return fluid will flow from the other ports P–2, P–1 to junction J–4 and through line 107.

The main distributor valve 22 is actuated by pilot electro valve 16. The valve 16 has four ports 54, 56, 54' and 56'. The port 54 is connected through lines 64 and 55 to return port 68' of valve 22. The port 56 is connected to line 118 and to reservoir 58. A pressure relief valve 15 set to discharge at low pressure, say 250 p.s.i., is connected between port 54 through line 65 and reservoir 58 through line 118, to maintain the pressure at a predetermined low value. The pilot valve 16 has a movable valve member controlled by solenoids S and S' at each end of the valve, said solenoids being connected through lead 100 to an automatic pilot 101. When solenoid S, for example, is energized, the ports 56, 54' and 54, 56' will be connected and when solenoid S' is energized the ports 54, 54' and 56, 56' will be connected. When the valve is in neutral position all four ports are connected.

The junction 110 is connected through line 111 to junction 112 and then through line 113 to pressure relief valve 116 which is connected through lines 117, 55, 64 to port 54. The junction 112 is connected through line 114 and normally closed bypass valve 115 to return line 118 connected to reservoir 58. The relief valve 116 is designed to open at a high pressure of say 3,000 p.s.i.

When operating with the automatic pilot 101 to steer a ship, for example, assuming that the position of the rudder does not have to be changed to maintain the course, neither of the solenoids S or S' will be energized so that the valve 16 will be in neutral position with all its ports connected. As a result, the distributor valve 22 will also be in neutral position so that the pressure from the pump 14 will be fed through the connected ports 68, 68', through line 55, through connected ports 54, 56 of valve 16 to reservoir 58. Although all the ports of valve 16 are connected, since the pressure applied to ports 22a, 22b of valve 22 will be equal, the valve 22 will not be actuated.

Since the lines 72, 73 are blocked due to the fact that ports 69, 70 of valve 22 will be in closed position when the valve 22 is in neutral position, the hydraulic actuators 19 and 20 will be blocked thereby maintaining the rudder in set position.

If the position of the rudder has to be corrected by the automatic pilot 101 the valve 16 will be displaced into one of its extreme positions by the energization of one of the solenoids, say solenoid S for example. As a result, fluid under pressure from pump 14 will flow through ports 54, 56' to actuating port 22b of selector valve 22, moving the latter into one of its extreme operating positions and connected ports 68, 69 and 68', 70. As a result, fluid under high pressure from pump 14 will flow through line 71 and through ports 68, 69 and line 72 to port 28 of valve 34.

As previously described, this will cause ports 28, 35 and ports 31, 36 of valve 34 to be connected so that fluid under pressure will flow through ports 28, 35 to junction J–1 and to the hydraulic actuators 19 and 20 to energize the latter and the fluid will be returned through the other junction J–2, ports 36, 31, line 73 and through the ports 70, 68' of selector valve 22 to lines 55 and 64 and through low pressure valve 15 to reservoir 58.

Due to the fact that junctions J–1, J–2 are connected to ports 35, 36 of valve 34', no fluid will flow through said valve.

In the event of failure of the motor driven pump 14, or in the event it is desired to operate the rudder manually, this can be accomplished by merely actuating the steering wheel 102 so that fluid under pressure from pump 11 will flow through either lines 103, 104 and ports 28, 31 of valve 34' to the actuators 19 and 20 and be returned through the other line to the reservoir 58'.

It is to be noted that when the actuators 19, 20 are at the end of their stroke, there will be no return fluid flowing. Thus, in the example above described, there will be no return fluid through ports 70, 68' which are connected to line 64 and to port 54 of valve 16 and through low pressure valve 15 to reservoir 58. Due to valve 15, the pressure at port 54 with fluid flow from actuators 19, 20 will be 250 p.s.i.

Assuming that the return springs of the hydro-valve 22 should be damaged so that the valve 22 should stick in its set position with ports 68, 69 and 68', 70 connected, if solenoid S' is then actuated to change the rudder position, in the absence of fluid under pressure applied to port 54 which would normally be the case if there is no return flow from the actuators and hydro-valve 22 sticks in an operating position, the rudder shaft RS could not be moved to change course.

This is due to the fact that even if solenoid S' is energized to connect ports 54, 54' and 56, 56' of pilot valve 16, with ports 68' and 70 of valve 22 still connected and with no return flow, there would be no fluid under pressure applied to port 54 which could be fed to port 22a of valve 22 to actuate the latter.

With the invention herein described, this problem is eliminated. Thus, with ports 68, 69 of valve 22 connected and with the actuators at the end of their strokes, the fluid under pressure from pump 14 will be applied to valve 116 and when such pressure built up to say 3,000 p.s.i., the valve will open so fluid will flow to line 64 causing valve 15 to open to maintain the pressure at port 54 at 250 p.s.i. which would then be applied to port 22a of valve 22 to actuate the latter to connect the position of the rudder shaft.

Having thus described my invention, what I claim as new and desire to secure by Letters Patent of the United States is:

1. A hydraulic system comprising an actuator having two control ports, a distributor valve having a neutral position and two operating positions, said distributor valve having two control ports connected to the ports of said actuator, a pressure inlet port and a return port, a fluid pump connected to the inlet port of said distributor valve for direction of the fluid from the pump to one of the control ports of the actuator in either operating position of the distributor valve, hydraulic means controlling the setting of said distributor valve, a pilot valve controlling said hydraulic means, said distributor valve when in neutral position connecting said fluid pump to said pilot valve, and means when said distributor valve is in either of its operating positions to provide a source of fluid under pressure into said pilot valve from the return flow from the actuator and/or directly from said fluid pump.

2. The combination set forth in claim 1 in which said distributor valve has a movable valve member, the hydraulic means controlling said distributor valve reacts against opposed ends of said valve members, each of said hydraulic means having an associated operating port, said pilot valve has a pair of control ports connected respectively to the operating ports of said distributor valve, an inlet port and a return port, said return port of said distributor valve being connected to the inlet port of said pilot valve, said pilot valve having a neutral position in which all of its ports are connected and two operating positions to direct fluid from its inlet port either of its control ports.

3. The combination set forth in claim 2 in which a reservoir is provided and a pressure relief valve is connected between the inlet port of said pilot valve and said reservoir to prevent the pressure applied to said inlet port from exceeding a predetermined amount.

4. The combination set forth in claim 3 in which a second pressure relief valve is provided connected between said fluid pump and said inlet port of said pilot valve, said second pressure relief valve being set to open at a pressure higher than that of said first pressure relief valve.

5. The combination set forth in claim 1 in which said pilot valve is electrically actuated.

6. The combination set forth in claim 1 in which a pair of double check valves are provided each valve having a pair of operating ports and a pair of control ports, a manually operated reversible fluid pump, having a pair of ports, means connecting the ports of said pump to the control ports of one of said check valves, means connecting the control ports of said distributor valve to the control ports of said other check valve, means connecting the respective operating ports of said two check valves to the control ports of said actuator, each of said double check valves permitting flow of fluid therethrough only when the pressure at either of the control ports thereof exceeds the pressure applied to either of the control ports of the other check valve.

7. The combination set forth in claim 6 in which a pressure relief means are connected to the control ports of said actuator to prevent the pressure from exceeding a predetermined amount.

References Cited

UNITED STATES PATENTS 2,755,625   7/1956   Acton.
3,233,407   2/1966   Smith.

EDGAR W. GEOGHEGAN, Primary Examiner

U.S. Cl. X.R.

91—461; 114—150